United States Patent
Bai (10) Patent No.: US 12,265,816 B2
(45) Date of Patent: Apr. 1, 2025

(54) METHOD AND APPARATUS FOR UPDATING CLOUD PLATFORM

(71) Applicants: Beijing Jingdong Shangke Information Technology Co., Ltd., Beijing (CN); Beijing Jingdong Century Trading Co., Ltd., Beijing (CN)

(72) Inventor: Shi Bai, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 97 days.

(21) Appl. No.: 18/021,741

(22) PCT Filed: May 11, 2021

(86) PCT No.: PCT/CN2021/092932
§ 371 (c)(1),
(2) Date: Feb. 16, 2023

(87) PCT Pub. No.: WO2022/048179
PCT Pub. Date: Mar. 10, 2022

(65) Prior Publication Data
US 2023/0367577 A1    Nov. 16, 2023

(30) Foreign Application Priority Data
Sep. 1, 2020  (CN) .......................... 202010903191.8

(51) Int. Cl.
*G06F 8/65*    (2018.01)
*G06F 8/61*    (2018.01)
(Continued)

(52) U.S. Cl.
CPC ................ *G06F 8/65* (2013.01); *G06F 9/455* (2013.01); *G06F 9/45558* (2013.01); *G06F 9/48* (2013.01);
(Continued)

(58) Field of Classification Search
CPC .......... G06F 8/65; G06F 9/5016; G06F 9/505; G06F 9/45558; G06F 9/5077; G06F 9/48;
(Continued)

(56) References Cited

U.S. PATENT DOCUMENTS 10,579,364 B2 *  3/2020  Doshi .................. G06F 16/128
11,070,488 B2    7/2021  You et al.
(Continued)

FOREIGN PATENT DOCUMENTS

CN    107229646 A    10/2017
CN    108292213 A    7/2018
(Continued)

OTHER PUBLICATIONS

Adrian M. Caulfield et al., A cloud-scale acceleration architecture, 2016 IEEE, [Retrieved on Nov. 18, 2024]. Retrieved from the internet: <URL: https://ieeexplore.ieee.org/stamp/stamp.jsp?tp=&arnumber=7783710> 13 Pages (1-13) (Year: 2016).*
(Continued)

*Primary Examiner* — Anibal Rivera
(74) *Attorney, Agent, or Firm* — Buchanan Ingersoll & Rooney, PC (57) ABSTRACT

A method and an apparatus for updating a cloud platform are provided. The method may include: in response to receiving an update request, acquiring cluster gene information of a to-be-updated cloud platform corresponding to the update request, the cluster gene information being structured information that entirely represents information of each component in a cloud platform container cluster; determining, on
(Continued)

the basis of the cluster gene information, each target component of the to-be-updated cloud platform corresponding to the cluster gene information and a level to which each target component belongs; updating each target component, on the basis of the level to which each target component belongs and the cluster gene information of the corresponding target component; and determining a hardware resource of the to-be-updated cloud platform and a software resource of the to-be-updated cloud platform, based on all of the updated target components.

17 Claims, 4 Drawing Sheets

(51) Int. Cl.
*G06F 9/455* (2018.01)
*G06F 9/50* (2006.01)
*G06F 9/48* (2006.01)
*G06F 9/54* (2006.01)

(52) U.S. Cl.
CPC .............. *G06F 9/4881* (2013.01); *G06F 9/50* (2013.01); *G06F 9/5016* (2013.01); *G06F 9/5038* (2013.01); *G06F 9/505* (2013.01); *G06F 9/5072* (2013.01); *G06F 9/5077* (2013.01); *G06F 9/54* (2013.01)

(58) Field of Classification Search
CPC ........ G06F 9/54; G06F 9/4881; G06F 9/5038; G06F 9/5072; G06F 9/455; G06F 9/50
See application file for complete search history.

(56) References Cited

U.S. PATENT DOCUMENTS

| | | | |
|---|---|---|---|
| 2014/0075427 | A1 | 3/2014 | Pallamreddy et al. |
| 2015/0012624 | A1* | 1/2015 | Geiger .................... H04L 41/40 709/221 |
| 2015/0142728 | A1 | 5/2015 | Nigam et al. |
| 2017/0371639 | A1 | 12/2017 | Simek et al. |
| 2018/0067736 | A1* | 3/2018 | De Zaeytijd .............. G06F 8/65 |
| 2019/0042325 | A1* | 2/2019 | Nair .................... G06F 9/45558 |
| 2020/0050444 | A1 | 2/2020 | Nikam et al. |
| 2020/0249928 | A1 | 8/2020 | Zeng et al. |
| 2020/0379794 | A1* | 12/2020 | Kim .................... G06F 9/45558 |

FOREIGN PATENT DOCUMENTS

| | | |
|---|---|---|
| CN | 109062655 A | 12/2018 |
| CN | 110333889 A | 10/2019 |
| CN | 111274000 A | 6/2020 |
| CN | 111311362 A | 6/2020 |
| CN | 111324417 A | 6/2020 |
| CN | 112306626 A | 2/2021 |
| EP | 2801935 A1 | 11/2014 |
| JP | 2020010311 A | 1/2020 |
| WO | 2020083891 A1 | 4/2020 |

OTHER PUBLICATIONS

International Search Report and Written Opinion for International Application No. PCT/CN2021/092932, dated Aug. 17, 2021, 10 pages.

"Learning ideas and practical knowledge while moving on Azure," Jan. 30, 2018, 14 pages with English translation.

* cited by examiner

Fig. 5

METHOD AND APPARATUS FOR UPDATING CLOUD PLATFORM

This patent application is a national stage of International Application No. PCT/CN2021/092932, filed May 11, 2021, which claims the priority of the Chinese patent application No. 202010903191.8, filed on Sep. 1, 2020, the contents of each of which are herein incorporated by reference in their entireties.

TECHNICAL FIELD

The present disclosure relates to the field of computer technology, in particular to the technical field of cloud computing, and more particularly, to a method and apparatus for updating a cloud platform.

BACKGROUND OF THE INVENTION

Proprietary cloud and public cloud have similar architectures and are used to support large, complex, and dynamically changing customer business systems. Proprietary cloud uses a layered management architecture, a bottom layer of the proprietary cloud architecture supports physical server clusters, and supports various business systems of users by providing multiple products, resources and services such as infrastructure as a service IaaS, platform as a service PaaS, and software as a service SaaS. Proprietary cloud uses container cluster technology to organize and manage application service programs provided by various product lines.

SUMMARY OF THE INVENTION

The present disclosure provides a method and apparatus for updating a cloud platform, a device and a storage medium.

According to a first aspect of the present disclosure, a method for updating a cloud platform is provided, the method including: in response to receiving an update request, acquiring cluster gene information of a to-be-updated cloud platform corresponding to the update request, the cluster gene information being structured information that entirely represents information of each component in a cloud platform container cluster; determining, on the basis of the cluster gene information, each target component of the to-be-updated cloud platform corresponding to the cluster gene information and a level to which each target component belongs; updating each target component, on the basis of the level to which each target component belongs and the cluster gene information of the corresponding target component; and determining a hardware resource of the to-be-updated cloud platform and a software resource of the to-be-updated cloud platform, based on all of the updated target components.

In some embodiments, the acquiring cluster gene information of a to-be-updated cloud platform corresponding to the update request, includes: extracting the cluster gene information of the to-be-updated cloud platform corresponding to the update request from a resource library of a standard cloud platform, where the standard cloud platform is a unified cloud platform on which a proprietary cloud platform is deployed.

In some embodiments, the level to which the target component belongs is determined based on a system architecture of the to-be-updated cloud platform; and the updating the target component, on the basis of the level to which the target component belongs and the cluster gene information of the target component, includes: stopping all service programs corresponding to the target component at the level to which the target component belongs and above the level to which the target component belongs, on the basis of the level to which the target component belongs; and updating the target component, in response to completion of the stopping, on the basis of the cluster gene information of the target component.

In some embodiments, after acquiring cluster gene information of a to-be-updated cloud platform corresponding to the update request, the method further includes: classifying the cluster gene information, on the basis of a type of the component to which the cluster gene information belongs and/or a state of the component to which the cluster gene information belongs, to obtain classified cluster gene information.

In some embodiments, the method further includes: verifying the to-be-updated cloud platform, on the basis of the hardware resource and the software resource, to obtain verified resource information of the to-be-updated cloud platform, where the verification is performed by verifying integrity, consistency and correctness of a dependency relationship of gene data in the cluster gene information of the to-be-updated cloud platform.

In some embodiments, the to-be-updated cloud platform and the standard cloud platform are KUBERNETES based container cluster platforms.

In some embodiments, the method further includes: determining to-be-offline product line information in the to-be-updated cloud platform, on the basis of the determined hardware resource and the software resource; labeling cluster gene information corresponding to the to-be-offline product line in the to-be-updated cloud platform, on the basis of the to-be-offline product line information, where the labeling is performed based on a dependency relationship between gene data in the cluster gene information; and deleting the cluster gene information corresponding to the to-be-offline product line in the to-be-updated cloud platform, on the basis of the labeled information.

According to a second aspect of the present disclosure, an apparatus for updating a cloud platform is provided. The apparatus includes: an acquiring unit, configured to acquire, in response to receiving an update request, cluster gene information of a to-be-updated cloud platform corresponding to the update request, the cluster gene information being structured information that entirely represents information of each component in a cloud platform container cluster; a first determining unit, configured to determine, on the basis of the cluster gene information, each target component of the to-be-updated cloud platform corresponding to the cluster gene information and a level to which each target component belongs; an updating unit, configured to update each target component, on the basis of the level to which each target component belongs and the cluster gene information of the corresponding target component; and a second determining unit, configured to determine a hardware resource of the to-be-updated cloud platform and a software resource of the to-be-updated cloud platform, based on all of the updated target components.

In some embodiments, the acquiring unit is further configured to extract the cluster gene information of the to-be-updated cloud platform corresponding to the update request from a resource library of a standard cloud platform, where the standard cloud platform is a unified cloud platform on which a proprietary cloud platform is deployed.

In some embodiments, the level to which the target component belongs in the updating unit is determined based on a system architecture of the to-be-updated cloud platform; and the updating unit includes: a stopping module, configured to stop all service programs corresponding to the target component at the level to which the target component belongs and above the level to which the target component belongs, on the basis of the level to which the target component belongs; and an updating module, configured to update the target component, in response to completion of the stopping, on the basis of the cluster gene information of the target component.

In some embodiments, the apparatus further includes: a classifying unit, configured to classify the cluster gene information, on the basis of a type of the component to which the cluster gene information belongs and/or a state of the component to which the cluster gene information belongs, to obtain classified cluster gene information.

In some embodiments, the apparatus further includes: a verification unit, configured to verify the to-be-updated cloud platform, on the basis of the hardware resource and the software resource, to obtain verified resource information of the to-be-updated cloud platform, where the verification is performed by verifying integrity, consistency and correctness of a dependency relationship of gene data in the cluster gene information of the to-be-updated cloud platform.

In some embodiments, the to-be-updated cloud platform and the standard cloud platform are KUBERNETES based container cluster platforms.

In some embodiments, the apparatus further includes: a third determining unit, configured to determine to-be-offline product line information in the to-be-updated cloud platform, on the basis of the determined hardware resource and the software resource; a labeling unit, configured to label cluster gene information corresponding to the to-be-offline product line in the to-be-updated cloud platform, on the basis of the to-be-offline product line information, where the labeling is performed based on a dependency relationship between gene data in the cluster gene information; and a deleting unit, configured to delete the cluster gene information corresponding to the to-be-offline product line in the to-be-updated cloud platform, on the basis of the labeled information.

According to a third aspect of the present disclosure, an electronic device is provided. The electronic device includes: at least one processor; and a memory communicatively connected to the at least one processor. The memory stores instructions executable by the at least one processor, and the instructions, when executed by the at least one processor, cause the at least one processor to perform the method according to any implementation in the first aspect.

According to a fourth aspect of the present disclosure, a non-transitory computer readable storage medium storing computer instructions is provided. The computer instructions are used to cause the computer to perform the method according to any implementation in the first aspect.

It should be understood that the content described in this section is not intended to identify key features or embodiments of the present disclosure, nor is it intended to limit the scope of the present disclosure. Other features of the present disclosure will become readily understood from the following description.

BRIEF DESCRIPTION OF THE DRAWINGS

The accompanying drawings are used for better understanding of the present solution, and do not constitute a limitation to the present disclosure.

DETAILED DESCRIPTION OF THE INVENTION

Example embodiments of the present disclosure are described below with reference to the accompanying drawings, where various details of embodiments of the present disclosure are included to facilitate understanding, and should be considered merely as examples. Therefore, those of ordinary skills in the art should realize that various changes and modifications can be made to the embodiments described here without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
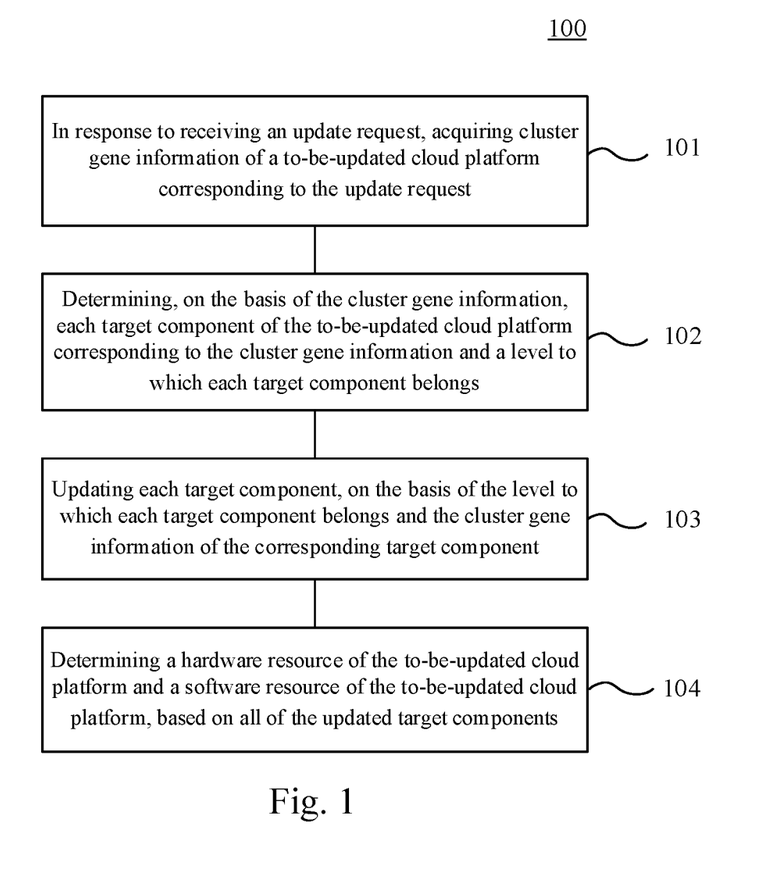
FIG. 1 is a schematic diagram of a first embodiment of a method for updating a cloud platform according to the present disclosure.

FIG. 1 shows a schematic diagram 100 of a first embodiment of a method for updating a cloud platform according to the present disclosure. The method for updating a cloud platform includes the following steps.

Step 101, in response to receiving an update request, acquiring cluster gene information of a to-be-updated cloud platform corresponding to the update request.

In the present embodiment, in response to receiving the update request from the cloud platform, an executing body may acquire the cluster gene information of the to-be-updated cloud platform corresponding to the update request from other electronic devices or locally through wired connection or wireless connection. The cluster gene information is structured information that can entirely represent information of each component in a cloud platform container cluster, through which automatic creation and component deployment of a same or similar cluster can be implemented. The cloud platform is built on the basis of container cluster gene. The components may include: platform system components and product line components. The platform components refer to basic core components performing managing, scheduling, or the like, in the cloud platform, and the product line components refer to components related to a product line, such as cloud hosts, cloud hard drives. The information includes: the number, configuration, composition, data, association relationship, or dependency relationship of the components. It should be noted that the above wireless connection may include, but is not limited to, 3G connection, 4G connection, 5G connection, WiFi connection, Bluetooth connection, WiMAX connection, Zigbee connection, UWB (ultra wideband) connection, and other wireless connection currently known or to be developed in the future.

Step 102, determining, on the basis of the cluster gene information, each target component of the to-be-updated cloud platform corresponding to the cluster gene information and a level to which each target component belongs.

In the present embodiment, the executing body may determine each target component corresponding to the cluster gene information and the level to which each target component belongs, on the basis of a corresponding relationship between the cluster gene information and each component of the to-be-updated cloud platform and a level division rule of the components. The target component is a to-be-updated component in the to-be-updated cloud platform.

Step 103, updating each target component, on the basis of the level to which each target component belongs and the cluster gene information of the corresponding target component.

In the present embodiment, the executing body may compare cluster gene information of the target component of each level with cluster gene information of the target component of the corresponding level in the original cloud platform (that is, the to-be-updated cloud platform) on the basis of the level to which each target component belongs, and according to a result of comparing, add new cluster gene information (that is, cluster gene information that is not in the cluster gene information of the original cloud platform) to a gene sequence of a gene library of the target component of the to-be-updated cloud platform, and replace cluster gene information in the gene library of the target component of the to-be-updated cloud platform with non-new cluster gene information (existing cluster gene information in the cluster gene information of the original cloud platform), so as to update each target component.

Step 104, determining a hardware resource of the to-be-updated cloud platform and a software resource of the to-be-updated cloud platform, based on all of the updated target components.

In the present embodiment, the executing body may determine the hardware resource of the to-be-updated cloud platform and the software resource of the to-be-updated cloud platform, based on all of the updated target components, using a platform determining method. The to-be-updated cloud platform may be a customer-specific cloud platform, and the customer-specific cloud platform refers to a proprietary cloud platform built in a customer-specific resource area.

It should be noted that the above updating method is a well-known technology widely studied and applied at present, detailed description thereof will be omitted.

Figure 2:
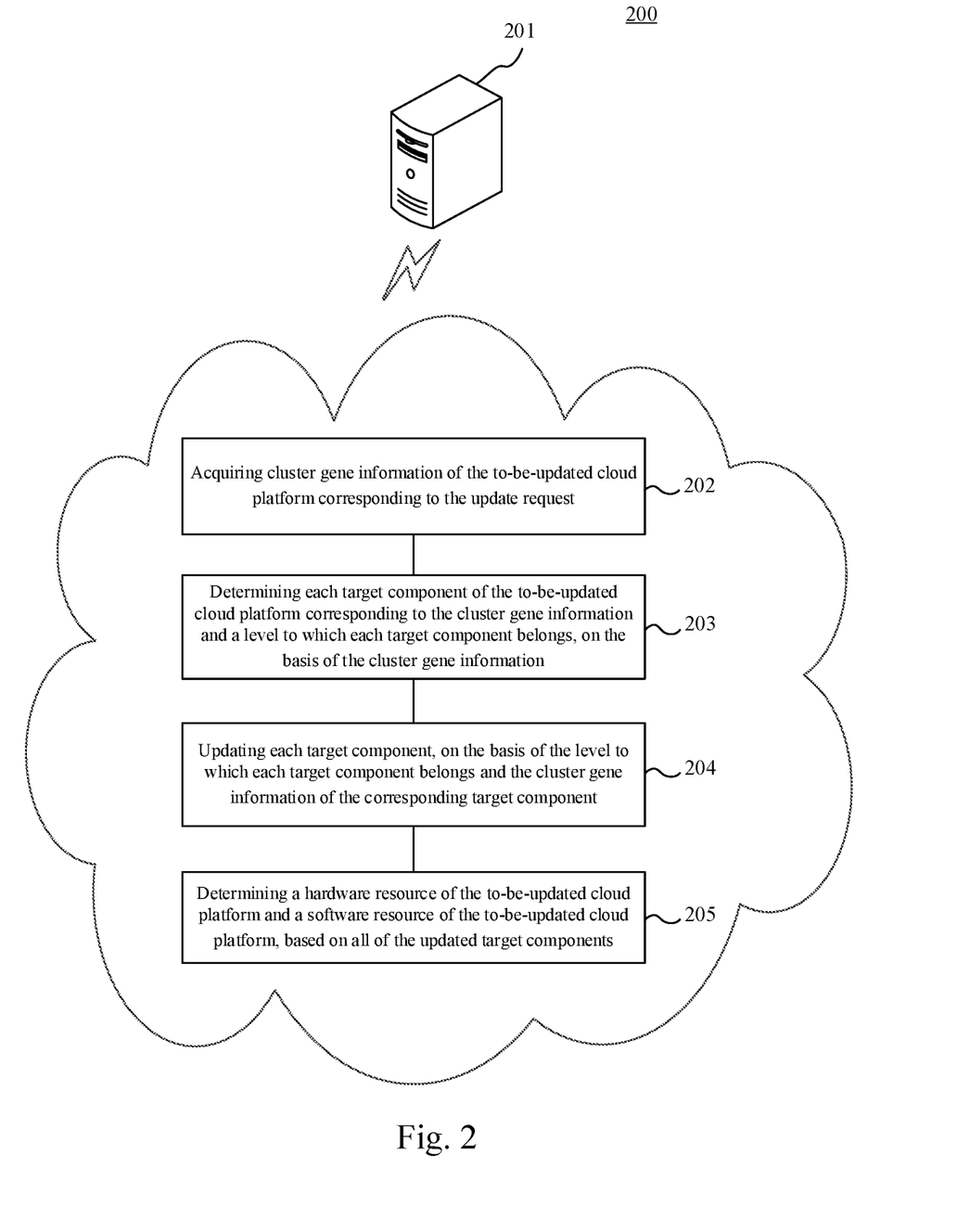
FIG. 2 is a scene diagram in which the method for updating a cloud platform according to an embodiment of the present disclosure can be implemented.

With further reference to FIG. 2, the method 200 for updating a cloud platform in the present embodiment runs in an electronic device 201. After receiving an update request for a cloud platform, the electronic device 201 first acquires cluster gene information of the to-be-updated cloud platform corresponding to the update request 202, then the electronic device 201 determines each target component of the to-be-updated cloud platform corresponding to the cluster gene information and a level to which each target component belongs, on the basis of the cluster gene information 203, next the electronic device 201 updates each target component, on the basis of the level to which each target component belongs and the cluster gene information of the corresponding target component 204, and finally the electronic device 201 determines a hardware resource of the to-be-updated cloud platform and a software resource of the to-be-updated cloud platform, based on all of the updated target components 205.

The method for updating a cloud platform provided by the above embodiments of the present disclosure, in response to receiving an update request, acquiring cluster gene information of a to-be-updated cloud platform corresponding to the update request, the cluster gene information being structured information that entirely represents information of each component in a cloud platform container cluster, on the basis of the cluster gene information, determining each target component of the to-be-updated cloud platform corresponding to the cluster gene information and a level to which each target component belongs, updating each target component, on the basis of the level to which each target component belongs and the cluster gene information of the corresponding target component, and determining a hardware resource of the to-be-updated cloud platform and a software resource of the to-be-updated cloud platform, based on all of the updated target components. The method solves the technical challenge of huge workload faced by a proprietary cloud platform in the deployment and upgrade process, at the same time solves the problem that the existing technology does not take into account the relationship between components and is prone to errors. The present solution uses a method of cluster gene replication and inheritance and performs data updating level-by-level to implement rapid, accurate, and stable upgrading of a customer-specific cloud platform.

Figure 3:
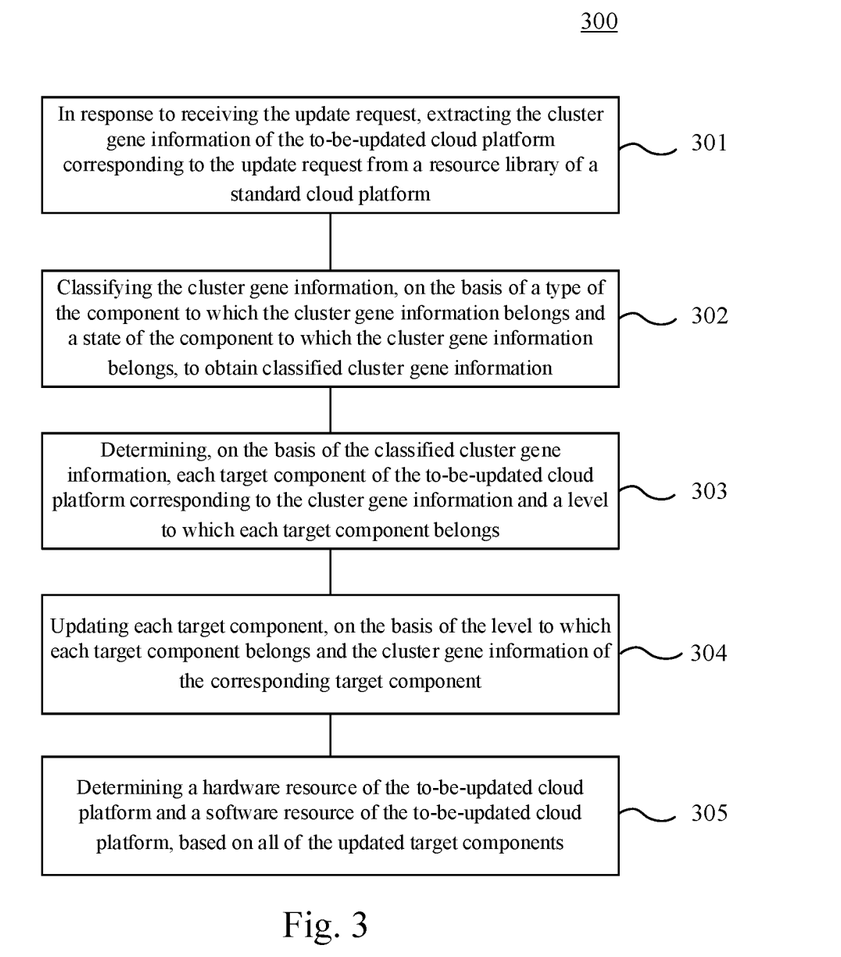
FIG. 3 is a schematic diagram of a second embodiment of the method for updating a cloud platform according to the present disclosure.

With further reference to FIG. 3, illustrating a schematic diagram 300 of a second embodiment of the method for updating a cloud platform. The flow of the method includes the following steps.

Step 301, in response to receiving the update request, extracting the cluster gene information of the to-be-updated cloud platform corresponding to the update request from a resource library of a standard cloud platform.

In the present embodiment, in response to receiving the update request from the cloud platform, the executing body may extract the cluster gene information of the to-be-updated cloud platform corresponding to the update request from the resource library of the standard cloud platform from other electronic devices or locally through wired connection or wireless connection. The extraction may be done by using a version identifier of the standard cloud platform, and the standard cloud platform may be a unified cloud platform on which a customer-specific cloud platform is deployed. The standard cloud platform is a proprietary cloud platform environment that has undergone long-term research and development and quality verification to ensure that various technical indicators such as function, performance, stability, scalability, and security can meet technical standards, and technical capabilities of the proprietary cloud platform deployed at the customer are to be deployed based on a standard proprietary cloud platform.

In the present embodiment, the to-be-updated cloud platform and the standard cloud platform are KUBERNETES based container cluster platforms. Based on advantages of KUBERNETES (k8s), the platforms can be deployed quickly, accurately and safely.

Step 302, classifying the cluster gene information, on the basis of a type of the component to which the cluster gene information belongs and a state of the component to which the cluster gene information belongs, to obtain classified cluster gene information.

In the present embodiment, the executing body may classify the cluster gene information, on the basis of the type of the component to which the cluster gene information belongs (for example: platform system components and product line components) and the state of the component to which the cluster gene information belongs, to obtain the classified cluster gene information, and perform subsequent steps on the classified cluster gene information. The state of the product line components may be divided into stateless service and stateful service. Stateless service refers to a service without a special state, each request is handled uniformly and indiscriminately by a server, and the request itself carries all parameters required by the server (the server itself does not store any data related to the request, excluding database storage information). Stateful service refers to the opposite of stateless service, a stateful service retains previously requested information on the server to handle a current request, such as session.

Step 303, determining, on the basis of the classified cluster gene information, each target component of the to-be-updated cloud platform corresponding to the cluster gene information and a level to which each target component belongs.

Step 304, updating each target component, on the basis of the level to which each target component belongs and the cluster gene information of the corresponding target component.

In some alternative implementations of the present embodiment, the level to which the target component belongs is determined based on a system architecture of the to-be-updated cloud platform; and the updating each target component, on the basis of the level to which each target component belongs and the cluster gene information of the corresponding target component, includes: stopping all service programs corresponding to the target component at the level to which the target component belongs and above the level to which the target component belongs, on the basis of the level to which the target component belongs; and updating the target component, in response to completion of the stopping, on the basis of the cluster gene information of the target component. It solves the technical problem that normal operation of the entire system is easily affected by the change of some components during the upgrade of the cloud platform, and improves the reliability and accuracy of platform updating.

To further illustrate, for the system architecture of the cloud platform, each lower-level system and component may support an upper-level system and component, if a lower-level component is changed, all the upper-level components may be affected. Therefore, data backup is performed on all systems of layers above each layer, and the service programs are closed layer by layer from top to bottom to ensure that after all the service programs are closed correctly, the platform system components are upgraded based on gene information of the platform system components corresponding to the cluster, the original service programs are replaced with new service programs, and the new services are configured. After the update is completed, new platform system components are started, and the service programs are started layer by layer from this layer to restore a running state of the proprietary cloud platform.

Step 305, determining a hardware resource of the to-be-updated cloud platform and a software resource of the to-be-updated cloud platform, based on all of the updated target components.

In some alternative implementations of the present embodiment, the method further includes: verifying the to-be-updated cloud platform, on the basis of the hardware resource and the software resource, to obtain verified resource information of the to-be-updated cloud platform, where the verification is performed by verifying integrity, consistency and correctness of a dependency relationship of gene data in the cluster gene information of the to-be-updated cloud platform. The method ensures that the upgraded platform is accurate and effective, and ensures the stability and reliability of the proprietary cloud platform system.

In some alternative implementations of the present embodiment, the method further includes: determining to-be-offline product line information in the to-be-updated cloud platform, on the basis of the determined hardware resource and the software resource; labeling cluster gene information corresponding to the to-be-offline product line in the to-be-updated cloud platform, on the basis of the to-be-offline product line information, where the labeling is performed based on a dependency relationship between gene data in the cluster gene information; and deleting the cluster gene information corresponding to the to-be-offline product line in the to-be-updated cloud platform, on the basis of the labeled information. The method realizes effective recovery of platform resources and ensures simplicity and effectiveness of a cloud platform gene library.

In the present embodiment, the operations of step 303 and step 305 are basically the same as the operations of step 102 and step 104 in the embodiment shown in FIG. 1, and repeated description thereof will be omitted.

As can be seen from FIG. 3, compared with the embodiment corresponding to FIG. 1, the schematic diagram 300 of the method for updating a cloud platform in the present embodiment extracts the cluster gene information of the to-be-updated cloud platform corresponding to the update request from the resource library of the standard cloud platform, classifies the cluster gene information, on the basis of the type of the component to which the cluster gene information belongs and the state of the component to which the cluster gene information belongs, to obtain the classified cluster gene information, on the basis of the classified cluster gene information, determines each target component of the to-be-updated cloud platform corresponding to the cluster gene information and the level to which each target component belongs, updates each target component, on the basis of the level to which each target component belongs and the cluster gene information of the corresponding target component, and determines the hardware resource of the to-be-updated cloud platform and the software resource of the to-be-updated cloud platform, based on all of the updated target components. The method solves the problem in the existing technology that a newly deployed cloud platform environment cannot be guaranteed to meet baseline conditions for standardized deployment, and realizes that in a K8S proprietary cloud container cluster environment, the customer-specific cloud platform is gradually and effectively upgraded by using an automatic method.

Figure 4:
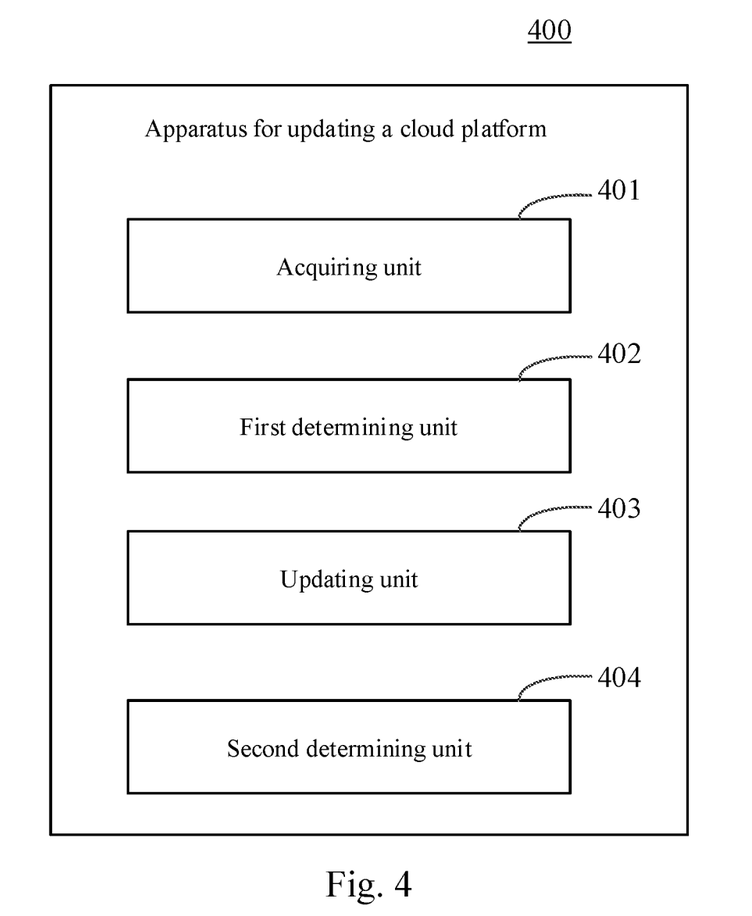
FIG. 4 is a schematic structural diagram of an embodiment of an apparatus for updating a cloud platform according to the present disclosure.

With further reference to FIG. 4, as an implementation of the method shown in the above figures, the present disclosure provides an embodiment of an apparatus for updating a cloud platform. The embodiment of the apparatus corresponds to the embodiment of the method shown in FIG. 1. Particularly, the apparatus may be used in various electronic devices.

As shown in FIG. 4, an apparatus 400 for updating a cloud platform in the present embodiment includes: an acquiring unit 401, a first determining unit 402, an updating unit 403 and a second determining unit 404. The acquiring unit is configured to, in response to receiving an update request, acquire cluster gene information of a to-be-updated cloud platform corresponding to the update request, the cluster gene information being structured information that entirely represents information of each component in a cloud platform container cluster. The first determining unit is configured to determine, on the basis of the cluster gene information, each target component of the to-be-updated cloud platform corresponding to the cluster gene information and a level to which each target component belongs. The updating unit is configured to update each target component, on the basis of the level to which each target component belongs and the cluster gene information of the corresponding target component. The second determining unit is configured to determine a hardware resource of the to-be-updated cloud platform and a software resource of the to-be-updated cloud platform, based on all of the updated target components.

In the present embodiment, in the apparatus 400 for updating a cloud platform: for the specific processing and the technical effects of the acquiring unit 401, the first determining unit 402, the updating unit 403 and the second determining unit 404, reference may be made to the relevant descriptions of step 101 to step 104 in the corresponding embodiment of FIG. 1, respectively, and detailed description thereof will be omitted.

In some alternative implementations of the present embodiment, the acquiring unit is further configured to extract the cluster gene information of the to-be-updated cloud platform corresponding to the update request from a resource library of a standard cloud platform, where the standard cloud platform is a unified cloud platform on which a proprietary cloud platform is deployed.

In some alternative implementations of the present embodiment, the level to which the target component belongs in the updating unit is determined based on a system architecture of the to-be-updated cloud platform; and the updating unit includes: a stopping module, configured to stop all service programs corresponding to the target component at the level to which the target component belongs and above the level to which the target component belongs, on the basis of the level to which the target component belongs; and an updating module, configured to update the target component, in response to completion of the stopping, on the basis of the cluster gene information of the target component.

In some alternative implementations of the present embodiment, the apparatus further includes: a classifying unit, configured to classify the cluster gene information, on the basis of a type of the component to which the cluster gene information belongs and/or a state of the component to which the cluster gene information belongs, to obtain classified cluster gene information.

In some alternative implementations of the present embodiment, the apparatus further includes: a verification unit, configured to verify the to-be-updated cloud platform, on the basis of the hardware resource and the software resource, to obtain verified resource information of the to-be-updated cloud platform, where the verification is performed by verifying integrity, consistency and correctness of a dependency relationship of gene data in the cluster gene information of the to-be-updated cloud platform.

In some alternative implementations of the present embodiment, the to-be-updated cloud platform and the standard cloud platform are KUBERNETES based container cluster platforms.

In some alternative implementations of the present embodiment, the apparatus further includes: a third determining unit, configured to determine to-be-offline product line information in the to-be-updated cloud platform, on the basis of the determined hardware resource and the software resource; a labeling unit, configured to label cluster gene information corresponding to the to-be-offline product line in the to-be-updated cloud platform, on the basis of the to-be-offline product line information, where the labeling is performed based on a dependency relationship between gene data in the cluster gene information; and a deleting unit, configured to delete the cluster gene information corresponding to the to-be-offline product line in the to-be-updated cloud platform, on the basis of the labeled information.

According to an embodiment of the present disclosure, the present disclosure further provides an electronic device and a readable storage medium.

Figure 5:
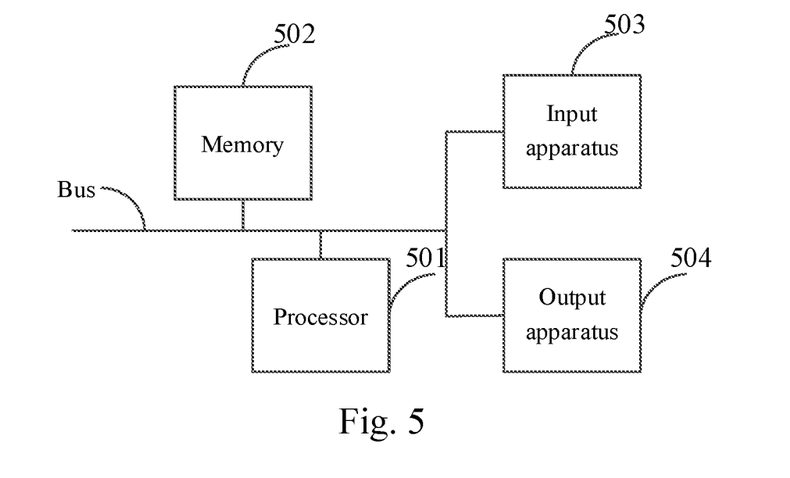
FIG. 5 is a block diagram of an electronic device used to implement the method for updating a cloud platform according to an embodiment of the present disclosure.

As shown in FIG. 5, is a block diagram of an electronic device of the method for updating a cloud platform according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device includes: one or more processors 501, a memory 502, and interfaces for connecting various components, including high-speed interfaces and low-speed interfaces. The various components are interconnected using different buses and may be mounted on a common motherboard or otherwise as desired. The processor may process instructions executed within the electronic device, including instructions stored in or on the memory to display graphical information of a GUI on an external input/output apparatus, such as a display device coupled to the interface. In other embodiments, a plurality of processors and/or a plurality of buses may be used with a plurality of memories and a plurality of memories, if desired. Likewise, a plurality of electronic devices may be connected, each providing some of the necessary operations (e.g., as a server array, a set of blade servers, or a multi-processor system). One processor 501 is used as an example in FIG. 5.

The memory 502 is a non-transitory computer readable storage medium provided by the present disclosure. The memory stores instructions executable by at least one processor, so that the at least one processor executes the method for updating a cloud platform provided by the present disclosure. The non-transitory computer readable storage medium of the present disclosure stores computer instructions, and the computer instructions are used to cause the computer to perform the method for updating a cloud platform provided by the present disclosure.

As a non-transitory computer readable storage medium, the memory 502 may be used to store non-transitory software programs, non-transitory computer-executable programs, and modules, such as program instructions/modules (for example, the acquiring unit 401, the first determining unit 402, the updating unit 403 and the second determining unit 404 shown in FIG. 4) corresponding to the method for updating a cloud platform in the embodiments of the present disclosure. The processor 501 executes various functional applications and data processing of the server by running the non-transitory software programs, instructions and modules stored in the memory 502, that is, implements the method for updating a cloud platform in the above method embodiments.

The memory 502 may include a stored program area and a stored data area, where the stored program area may store an operating system, an application program required by at least one function; and the stored data area may store data created according to the use of the electronic device for updating a cloud platform, etc. Additionally, the memory 502 may include a high-speed random access memory, and may also include a non-transitory memory, such as at least one magnetic disk storage device, a flash memory device, or other non-transitory solid-state storage device. In some embodiments, the memory 502 may optionally include memories located remotely from the processor 501, and these remote memories may be connected to the electronic device for updating a cloud platform via a network. Examples of such network include, but are not limited to, the Internet, an intranet, a local area network, a mobile communication network, and combinations thereof.

The electronic device of the method for updating a cloud platform may further include: an input apparatus 503 and an output apparatus 504. The processor 501, the memory 502, the input apparatus 503 and the output apparatus 504 may be connected via a bus or in other ways, and the connection via a bus is used as an example in FIG. 5.

The input apparatus 503 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of the present disclosure, in response to receiving an update request, acquiring cluster gene information of a to-be-updated cloud platform corresponding to the update request, the cluster gene information being structured information that entirely represents information of each component in a cloud platform container cluster; on the basis of the cluster gene information, determining each target component of the to-be-updated cloud platform corresponding to the cluster gene information and a level to which each target component belongs; updating each target component, on the basis of the level to which each target component belongs and the cluster gene information of the corresponding target component; and determining a hardware resource of the to-be-updated cloud platform and a software resource of the to-be-updated cloud platform, based on all of the updated target components. The technical solution solves the technical challenge of huge workload faced by a proprietary cloud platform in the deployment and upgrade process, at the same time solves the problem that the existing technology does not take into account the relationship between components and is prone to errors. The present solution uses a method of cluster gene replication and inheritance and performs data updating level-by-level to implement rapid, accurate, and stable upgrading of a client-specific cloud platform.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for updating a cloud platform, the method comprising:
   in response to receiving an update request, acquiring cluster gene information of a to-be-updated cloud platform corresponding to the update request, the cluster gene information being structured information that entirely represents information of each component in a cloud platform container cluster;
   determining, on the basis of the cluster gene information, each target component of the to-be-updated cloud platform corresponding to the cluster gene information and a level to which each target component belongs;
   updating each target component, on the basis of the level to which each target component belongs and the cluster gene information of the corresponding target component; and
   determining a hardware resource of the to-be-updated cloud platform and a software resource of the to-be-updated cloud platform, based on all of the updated target components;
   wherein the level to which the target component belongs is determined based on a system architecture of the to-be-updated cloud platform; and the updating each target component, on the basis of the level to which each target component belongs and the cluster gene information of the corresponding target component, comprises:
   stopping all service programs corresponding to each target component at the level to which each target component belongs and above the level to which each target component belongs, on the basis of the level to which each target component belongs; and
   updating each target component, in response to completion of the stopping, on the basis of the cluster gene information of each target component.

2. The method according to claim 1, wherein the acquiring cluster gene information of a to-be-updated cloud platform corresponding to the update request, comprises:
   extracting the cluster gene information of the to-be-updated cloud platform corresponding to the update request from a resource library of a standard cloud platform, wherein the standard cloud platform is a unified cloud platform on which a proprietary cloud platform is deployed.

3. The method according to claim 1, wherein, after acquiring cluster gene information of a to-be-updated cloud platform corresponding to the update request, the method further comprises:
   classifying the cluster gene information, on the basis of a type of the component to which the cluster gene information belongs and/or a state of the component to which the cluster gene information belongs, to obtain classified cluster gene information.

4. The method according to claim 1, wherein the method further comprises:
   verifying the to-be-updated cloud platform, on the basis of the hardware resource and the software resource, to obtain verified resource information of the to-be-updated cloud platform, wherein the verification is performed by verifying integrity, consistency and correctness of a dependency relationship of gene data in the cluster gene information of the to-be-updated cloud platform.

5. The method according to claim 2, wherein the to-be-updated cloud platform and the standard cloud platform are KUBERNETES based container cluster platforms.

6. The method according to claim 1, wherein the method further comprises:
   determining to-be-offline product line information in the to-be-updated cloud platform, on the basis of the determined hardware resource and the software resource;
   labeling cluster gene information corresponding to the to-be-offline product line in the to-be-updated cloud platform, on the basis of the to-be-offline product line information, wherein the labeling is performed based on a dependency relationship between gene data in the cluster gene information; and
   deleting the cluster gene information corresponding to the to-be-offline product line in the to-be-updated cloud platform, on the basis of the labeled information.

7. An apparatus for updating a cloud platform, the apparatus comprising:
   at least one processor; and
   a memory communicatively connected to the at least one processor;
   wherein the memory stores instructions executable by the at least one processor, and the instructions, when executed by the at least one processor, cause the at least one processor to perform operations, the operations comprising:
   acquiring, in response to receiving an update request, cluster gene information of a to-be-updated cloud platform corresponding to the update request, the cluster gene information being structured information that entirely represents information of each component in a cloud platform container cluster;
   determining, on the basis of the cluster gene information, each target component of the to-be-updated cloud platform corresponding to the cluster gene information and a level to which each target component belongs;
   updating each target component, on the basis of the level to which each target component belongs and the cluster gene information of the corresponding target component; and
   determining a hardware resource of the to-be-updated cloud platform and a software resource of the to-be-updated cloud platform, based on all of the updated target components;
   wherein the level to which the target component belongs is determined based on a system architecture of the to-be-updated cloud platform; and the updating each target component, on the basis of the level to which each target component belongs and the cluster gene information of the corresponding target component, comprises:
   stopping all service programs corresponding to each target component at the level to which each target component belongs and above the level to which each target component belongs, on the basis of the level to which each target component belongs; and updating each target component, in response to completion of the stopping, on the basis of the cluster gene information of each target component.

8. The apparatus according to claim 7, wherein the acquiring cluster gene information of a to-be-updated cloud platform corresponding to the update request, comprises: extracting the cluster gene information of the to-be-updated cloud platform corresponding to the update request from a resource library of a standard cloud platform, wherein the standard cloud platform is a unified cloud platform on which a proprietary cloud platform is deployed.

9. The apparatus according to claim 7, wherein after acquiring cluster gene information of a to-be-updated cloud platform corresponding to the update request, the operations further comprise:

classifying the cluster gene information, on the basis of a type of the component to which the cluster gene information belongs and/or a state of the component to which the cluster gene information belongs, to obtain classified cluster gene information.

10. The apparatus according to claim 7, wherein the operations further comprise:

verifying the to-be-updated cloud platform, on the basis of the hardware resource and the software resource, to obtain verified resource information of the to-be-updated cloud platform, wherein the verification is performed by verifying integrity, consistency and correctness of a dependency relationship of gene data in the cluster gene information of the to-be-updated cloud platform.

11. The apparatus according to claim 8, wherein the to-be-updated cloud platform and the standard cloud platform are KUBERNETES based container cluster platforms.

12. The apparatus according to claim 7, wherein the operations further comprise:

determining to-be-offline product line information in the to-be-updated cloud platform, on the basis of the determined hardware resource and the software resource;

labeling cluster gene information corresponding to the to-be-offline product line in the to-be-updated cloud platform, on the basis of the to-be-offline product line information, wherein the labeling is performed based on a dependency relationship between gene data in the cluster gene information; and deleting the cluster gene information corresponding to the to-be-offline product line in the to-be-updated cloud platform, on the basis of the labeled information.

13. A non-transitory computer readable storage medium storing computer instructions, wherein, the computer instructions are used to cause the computer to perform operations, the operations comprising:

acquiring, in response to receiving an update request, cluster gene information of a to-be-updated cloud platform corresponding to the update request, the cluster gene information being structured information that entirely represents information of each component in a cloud platform container cluster;

determining, on the basis of the cluster gene information, each target component of the to-be-updated cloud platform corresponding to the cluster gene information and a level to which each target component belongs;

updating each target component, on the basis of the level to which each target component belongs and the cluster gene information of the corresponding target component; and determining a hardware resource of the to-be-updated cloud platform and a software resource of the to-be-updated cloud platform, based on all of the updated target components;

wherein the level to which the target component belongs is determined based on a system architecture of the to-be-updated cloud platform; and the updating each target component, on the basis of the level to which each target component belongs and the cluster gene information of the corresponding target component, comprises:

stopping all service programs corresponding to each target component at the level to which each target component belongs and above the level to which each target component belongs, on the basis of the level to which each target component belongs; and updating each target component, in response to completion of the stopping, on the basis of the cluster gene information of each target component.

14. The non-transitory computer readable storage medium according to claim 13, wherein the acquiring cluster gene information of a to-be-updated cloud platform corresponding to the update request, comprises: extracting the cluster gene information of the to-be-updated cloud platform corresponding to the update request from a resource library of a standard cloud platform, wherein the standard cloud platform is a unified cloud platform on which a proprietary cloud platform is deployed.

15. The non-transitory computer readable storage medium according to claim 13, wherein after acquiring cluster gene information of a to-be-updated cloud platform corresponding to the update request, the operations further comprise:

classifying the cluster gene information, on the basis of a type of the component to which the cluster gene information belongs and/or a state of the component to which the cluster gene information belongs, to obtain classified cluster gene information.

16. The non-transitory computer readable storage medium according to claim 13, wherein the operations further comprise:

verifying the to-be-updated cloud platform, on the basis of the hardware resource and the software resource, to obtain verified resource information of the to-be-updated cloud platform, wherein the verification is performed by verifying integrity, consistency and correctness of a dependency relationship of gene data in the cluster gene information of the to-be-updated cloud platform.

17. The non-transitory computer readable storage medium according to claim 14, wherein the to-be-updated cloud platform and the standard cloud platform are KUBERNETES based container cluster platforms.

* * * * *